UNITED STATES PATENT OFFICE.

MAX H. FISCHER, OF WEST ORANGE, NEW JERSEY.

BAKING-POWDER.

SPECIFICATION forming part of Letters Patent No. 679,305, dated July 30, 1901.

Application filed March 28, 1901. Serial No. 53,317. (No specimens.)

*To all whom it may concern:*

Be it known that I, MAX H. FISCHER, a citizen of the United States, residing at West Orange, in the county of Essex, State of New Jersey, have invented a certain new and useful Improved Composition of Matter for Baking-Powder or Preservative Purposes; and I do hereby declare the following to be such a full, clear, and exact description of the same as will enable any one skilled in the art to which it appertains or with which it is most closely connected to make and use the same.

My present invention has for its object to provide an improved composition of matter particularly adapted for use as a baking-powder, but also capable of use as a preservative, and particularly in preserving fruits, vegetables, meats, or other substances inclosed in cans or hermetically-sealed receptacles when it is desirable to exclude atmospheric air before or at the time the package or receptacle is sealed or closed; and to this end the invention consists, broadly, in a dry compound containing benzoic acid

$$(C_7H_6O_2 = C_6H_5COOH)$$

and an alkaline carbonate, preferably carbonate or bicarbonate of soda, which compound when moistened with water or liquid in preserving or bread-making will cause the evolution of carbonic-acid gas and the formation of benzoate of sodium, which latter salt is recognized as a preservative and antiseptic.

The proportions in which the ingredients of the composition are used will vary from those which will give neither an acid nor an alkaline but a neutral reaction up to an excess of acidity, and I have found in practice that for baking-powder from one to one and a half parts of the ordinary flake or granular benzoic acid of commerce to two parts of the granular or powdered bicarbonate of soda of commerce gives satisfactory results. The proportions given and which I prefer to employ are different from those employed when making the salt benzoate of soda; but I believe that the heating of the bicarbonate of soda in preserving or baking enables me to employ a smaller amount of benzoic acid. Inasmuch as benzoic acid is not alone readily soluble in water and is not therefore particularly hygroscopic it is not absolutely necessary that a filler or inert material, such as starch, be employed in the compound; but, if desired, this can be used, its function being substantially the same as the starch or flour fillers ordinarily employed in baking-powders.

The compound is used as a baking-powder in substantially the same ways that other baking-powders are used; but as its efficiency in the evolution of carbonic-acid gas for leavening purposes is greater than most of the powders upon the market a much smaller quantity would be employed, and the benzoate of soda, which is the material left after the evolution of the gas, is of such a nature that it is harmless and is useful as a preservative and an antiseptic.

In employing the compound as a preservative in putting up fruits, vegetables, or other canned goods a quantity of the compounds is introduced into the can before sealing, and the carbonic-acid gas evolved is sufficient in quantity to drive out the air, and during the evolution of the gas or before it has entirely ceased the cover is applied and sealed. As stated, the benzoate of soda which is left in the can after the evolution of the gas is readily soluble and, as is well known, is a preservative and antiseptic.

What I claim as my invention, and desire to secure by Letters Patent, is—

1. A dry compound for baking-powder or preservative purposes containing benzoic acid and an alkaline carbonate.

2. A dry compound containing benzoic acid and an alkaline carbonate in proportion to produce an acid reaction.

3. A baking-powder containing benzoic acid and bicarbonate of soda in substantially the proportions specified.

MAX H. FISCHER.

Witnesses:
ALEXANDER S. STEWART,
FREDERICK F. CHURCH.